(12) United States Patent
Kondo

(10) Patent No.: US 10,899,222 B2
(45) Date of Patent: Jan. 26, 2021

(54) GRILL SHUTTER DEVICE FOR VEHICLE

(71) Applicant: TOYODA GOSEI CO., LTD., Kiyosu (JP)

(72) Inventor: Takeshi Kondo, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 193 days.

(21) Appl. No.: 16/161,126

(22) Filed: Oct. 16, 2018

(65) Prior Publication Data

US 2019/0126742 A1    May 2, 2019

(30) Foreign Application Priority Data

Oct. 27, 2017 (JP) ................................ 2017-208643

(51) Int. Cl.
| | |
|---|---|
| *B60K 11/08* | (2006.01) |
| *B62D 25/08* | (2006.01) |
| *B60K 11/06* | (2006.01) |
| *B60R 19/48* | (2006.01) |
| *B60R 19/18* | (2006.01) |

(52) U.S. Cl.
CPC ............ *B60K 11/085* (2013.01); *B60K 11/06* (2013.01); *B60R 19/48* (2013.01); *B62D 25/082* (2013.01); *B60R 2019/1886* (2013.01); *B60R 2019/486* (2013.01)

(58) Field of Classification Search
CPC ....... B60K 11/085; B60K 11/06; B60R 19/48; B60R 2019/1886; B60R 2019/486; B62D 25/082
USPC ................................................ 296/193.1, 29
See application file for complete search history.

(56) References Cited

U.S. PATENT DOCUMENTS

| | | | |
|---|---|---|---|
| 3,115,223 A * | 12/1963 | Shustrom ................. | F01P 7/10 49/2 |
| 8,561,739 B2 | 10/2013 | Hori | |
| 9,162,562 B2 * | 10/2015 | Bourqui .............. | B60K 11/085 |

(Continued)

FOREIGN PATENT DOCUMENTS

| | | | | |
|---|---|---|---|---|
| DE | 102013200939 A1 * | 7/2014 | ........... | B60K 11/085 |
| FR | 3064542 A1 * | 10/2018 | ........... | B60K 11/085 |

(Continued)

OTHER PUBLICATIONS

Office Action dated Sep. 8, 2020 issued in corresponding JP patent application No. 2017-208643 (and English translation).

*Primary Examiner* — Hilary L Gutman
(74) *Attorney, Agent, or Firm* — Posz Law Group, PLC

(57) ABSTRACT

A grill shutter device for vehicle includes a grill, a shutter, and a drive source. The grill is provided with an opening penetrating the grill in the front/rear direction. The shutter includes fins opening and closing the opening, lining up in a vehicular width direction, and curving so as to fit into a curved configuration of the grill. The drive source drives the shutter so that the fins open and close the opening. The fins include a body plate, and a support shaft fixed to the body plate, extending in a direction linearly linking between vehicular-width-direction opposite ends of a corresponding site in the opening, and supported to the grill so as to rotate when actuated by the drive source. Moreover, a universal joint joins between the support shafts of two of the fins neighboring one another in the vehicular width direction.

7 Claims, 13 Drawing Sheets

(56) References Cited

U.S. PATENT DOCUMENTS

| | | | |
|---|---|---|---|
| 2012/0012410 A1* | 1/2012 | Hori | B60K 11/085 |
| | | | 180/68.1 |
| 2013/0012115 A1* | 1/2013 | Schwarz | B60K 11/085 |
| | | | 454/155 |
| 2013/0264133 A1* | 10/2013 | Remy | B60K 11/085 |
| | | | 180/68.1 |
| 2013/0284401 A1* | 10/2013 | Kiener | B60K 11/085 |
| | | | 165/98 |
| 2013/0333501 A1* | 12/2013 | Knauer | B60K 11/085 |
| | | | 74/102 |
| 2014/0273807 A1 | 9/2014 | Frayer, III | |
| 2014/0284123 A1 | 9/2014 | Bourqui et al. | |
| 2014/0308890 A1* | 10/2014 | Schneider | B60H 1/00857 |
| | | | 454/335 |
| 2015/0197147 A1* | 7/2015 | Koh | H02K 1/146 |
| | | | 180/68.1 |
| 2015/0321548 A1* | 11/2015 | Hori | F01P 7/10 |
| | | | 180/68.1 |
| 2017/0080794 A1* | 3/2017 | Yamamoto | B60K 11/085 |
| 2017/0326967 A1* | 11/2017 | Brueckner | B60K 11/085 |
| 2017/0326970 A1* | 11/2017 | Schoening | B60K 11/085 |
| 2019/0118643 A1* | 4/2019 | Momii | B60K 11/085 |
| 2019/0241062 A1* | 8/2019 | Shimizu | B60K 11/085 |

FOREIGN PATENT DOCUMENTS

| | | |
|---|---|---|
| JP | 2013-199178 A | 10/2013 |
| JP | 2013-220783 A | 10/2013 |
| JP | 2016-501762 A | 1/2016 |
| JP | 2016-511193 A | 4/2016 |

\* cited by examiner

GRILL SHUTTER DEVICE FOR VEHICLE

INCORPORATION BY REFERENCE

The present invention is based on Japanese Patent Application No. 2017-208643, filed on Oct. 27, 2017, the entire contents of which are incorporated herein by reference.

BACKGROUND OF THE INVENTION

1. Field of the Invention

The present invention relates to a grill shutter device for vehicle.

2. Description of the Related Art

Japanese Translation of PCT Application Gazette No. 2016-501762, for instance, discloses a conventionally-known vehicular grill shutter device provided at the front of a vehicle. The grill shutter device comprises a grill, a shutter, and a drive source. The grill, which is arranged at a vehicular front, includes an opening penetrating the grill in the front/rear direction. The opening, which elongates in the width direction of the vehicle, is formed as in rectangular shape when viewed on the vehicular-front side. The shutter includes a plurality of fins opening and closing corresponding sites in the opening. The fins are arranged to line up one after another in the up/down direction. The drive source, with which the grill shutter device is provided in a quantity of one, actuates all the fins between the open-up state and the close-down state so that they open and close the opening in the grill.

Each of the fins of the shutter includes a body plate, and a support shaft. The body plate is formed as a configuration coinciding with a configuration of the grill. The support shaft, which extends in the vehicular width direction, is fixed to the body plate. The support shaft is supported to the grill so as to rotate when actuated by the drive source. In the conventionally-known vehicular grill shutter that Japanese Translation of PCT Application Gazette No. 2016-501762 discloses, all the fins present within the opening line up parallel to each other.

SUMMARY OF THE INVENTION

Incidentally, the front of a vehicle is curved in a forward convexed manner in the width direction of the vehicle. Accordingly, a grill is also curved in a forward convexed manner in the vehicular width direction. Consequently, the opening face of an opening makes a curved face, which is convexed toward the front, at the middle in the vehicular width direction. Under the circumstances, the body plate of the fins is formed preferably so as to have a curved face, which fits into the opening face of the opening, in order to ensure the closed opening decorativeness.

In a grill shutter device whose fins are constructed not only to include a body plate having a curved face but also a support shaft extending linearly in the width direction of a vehicle, the curved face of the body plate becomes likely to be visible through the opening in a grill when viewed on a front side of the vehicle. This is because the curved face of the body plate curves in the fins in an upward convexed manner when the fins rotate about the support shaft to open up the opening. The longer length each of the fins has in the vehicular width direction, the more remarkable the curved face tends to be visible. The grill shutter device, which comprises the fins whose body plate has a curved face likely to be visible through the opened-up opening, looks or appears poor decoratively.

The present invention has been developed in view of the circumstances as described above. It is therefore an object of the present invention to provide a vehicular grill shutter device comprising fins which curve to fit into a curved configuration of a grill and exhibit upgraded looking or appearance through the grill whose opening is opened up.

For example, a grill shutter device for vehicle according to the present invention comprises:

a grill arranged at a vehicular front in a curved manner, and provided with an opening which penetrates the grill in a front/rear direction thereof;

a shutter including a plurality of fins which open and close the opening, which line up in a vehicular width direction, and which curves so as to fit into a curved configuration of the grill; and a drive source driving the shutter so that the fins open and close the opening;

each of the fins including:

a body plate formed as a configuration coinciding with a configuration of a corresponding site in the opening; and a support shaft fixed to the body plate, extending in a direction which linearly links between vehicular-width-direction opposite ends of the corresponding site in the opening, and supported to the grill so as to rotate when actuated by the drive source;

the shutter further including a universal joint joining between the support shafts of two of the fins which neighbor one another in the vehicular width direction.

The thus constructed vehicular grill shutter device according to the present invention allows transmitting a rotation around the axis of one of the support shafts to another one of the support shafts, because it comprises the universal joint joining between the support shafts of two of the fins which neighbor one another in the vehicular width direction. Moreover, the present vehicular grill shutter device permits changing a relative angle between the two support shafts which join to one another via the universal joint. In addition, the present vehicular grill shutter device enables each of the rotating fins to open and close the opening in the grill about the support shaft while hardly moving the support shafts of the fins positionally, or hardly displacing them angularly, relative to the grill. That is, the use of the universal joint turns the fins of the shutter into a multi-joint structure. Accordingly, the universal joint enables the respective fins, which open up the opening in the grill, to hide at the rear-face side of the support shafts, or get behind the rear face of the support shafts, even when each of the fins curves to fit into a curved configuration of the grill. Consequently, the present vehicular grill shutter device allows upgrading the fins, which curve to fit into a curved configuration of the grill, in the looking or appearance when they open up the opening in the grill.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Hereinafter, a specific embodiment mode of a grill shutter device for vehicle according to the present invention will be described using FIGS. 1 through 19. Note that the terms indicating directions, namely, "front," "rear," "up" and "down" that are employed to describe the following embodiments, shall coincide with the directions to which a passenger faces when he or she sits across from the front of a vehicle.

(1) CONSTRUCTION OF GRILL SHUTTER DEVICE FOR VEHICLE

Figure 1:
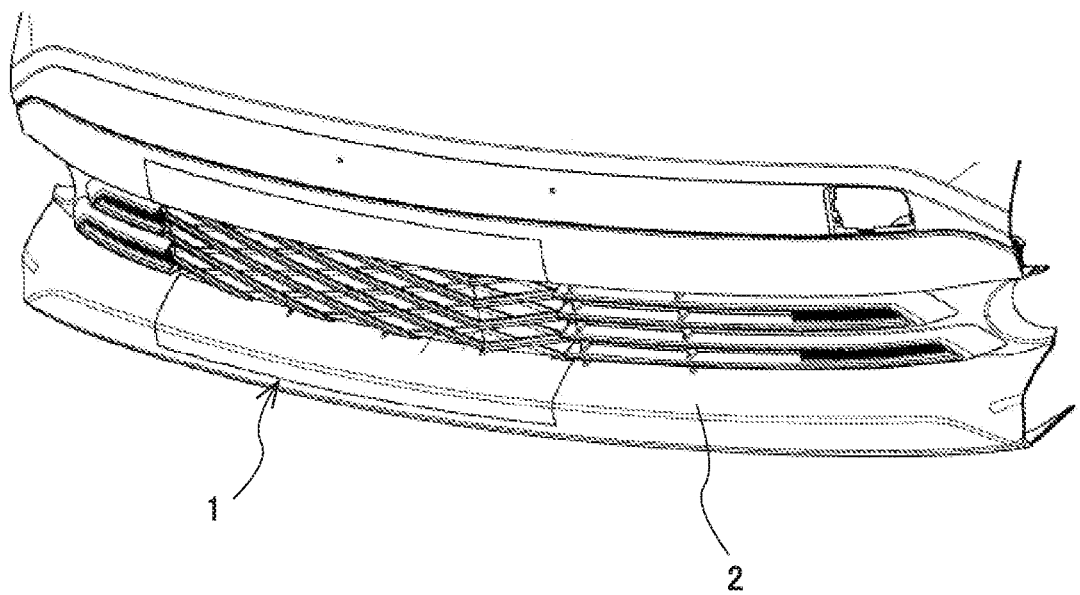
FIG. 1 is a perspective view of a vehicular front having a grill shutter device for vehicle according to Embodiment of the present invention on-board.

A grill shutter device 1 for vehicle according to Embodiment is an onboard device to be installed within a vehicle. In an engine room at the front of a vehicle, a radiator is arranged to cool the engine. The radiator is fixed to a body of the vehicle. As illustrated in FIG. 1, the vehicular grill shutter device 1 is arranged against the radiator at a frontal body 2 in front of the vehicle. The vehicular grill shutter device 1 has a function of cooling an engine coolant by leading air from a vehicular front to the radiator. Note that the vehicular grill shutter device 1 satisfactorily has another function of improving aerodynamic characteristics of the vehicle as well.

Figure 2:
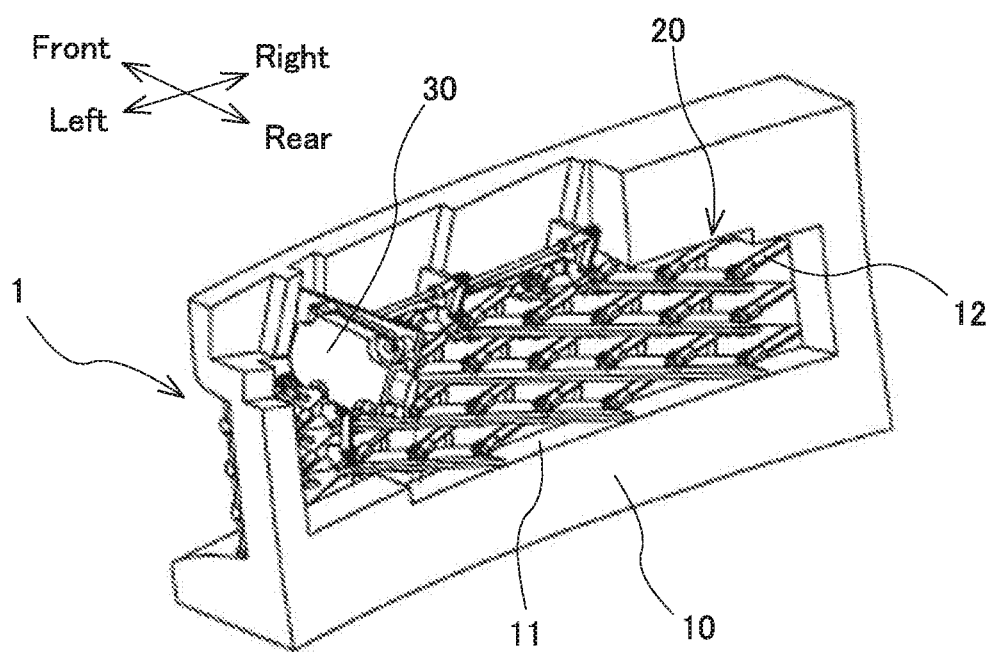
FIG. 2 is a perspective view of a major part of the present vehicular grill shutter device according to Embodiment when viewed on the side of a vehicular rear.

As illustrated in FIG. 2, the vehicular grill shutter device 1 comprises a grill 10, a shutter 20, and a drive source 30. The vehicular grill shutter device 1, which is driven by the drive source 30, actuates the shutter 20 to open and close a later-described opening with which the grill 10 is provided. Thus, the vehicular grill shutter device 1 allows adjusting the volume of air to be led to the radiator, or permits controlling the aerodynamic characteristics.

The grill 10 is a member elongating in a width direction of the vehicle, and formed in a strip shape. The grill 10 is arranged against the radiator at the vehicular foremost part on the vehicular front side. The grill 10 is formed as an arc configuration which curves to swell toward the vehicular front side at the middle in the vehicular width direction so as to locate the vehicular-width-direction opposite ends on the vehicular rear side when viewed in the up/down direction. Note that the grill 10 satisfactorily inclines in the front/rear direction so that the upper part and lower part locate at different positions from one another in the front/rear direction. Moreover, the grill 10 adequately makes all of a grill region with which the frontal body 2 is provided, or suitably makes some of the grill region as shown in FIG. 1.

Figure 3:
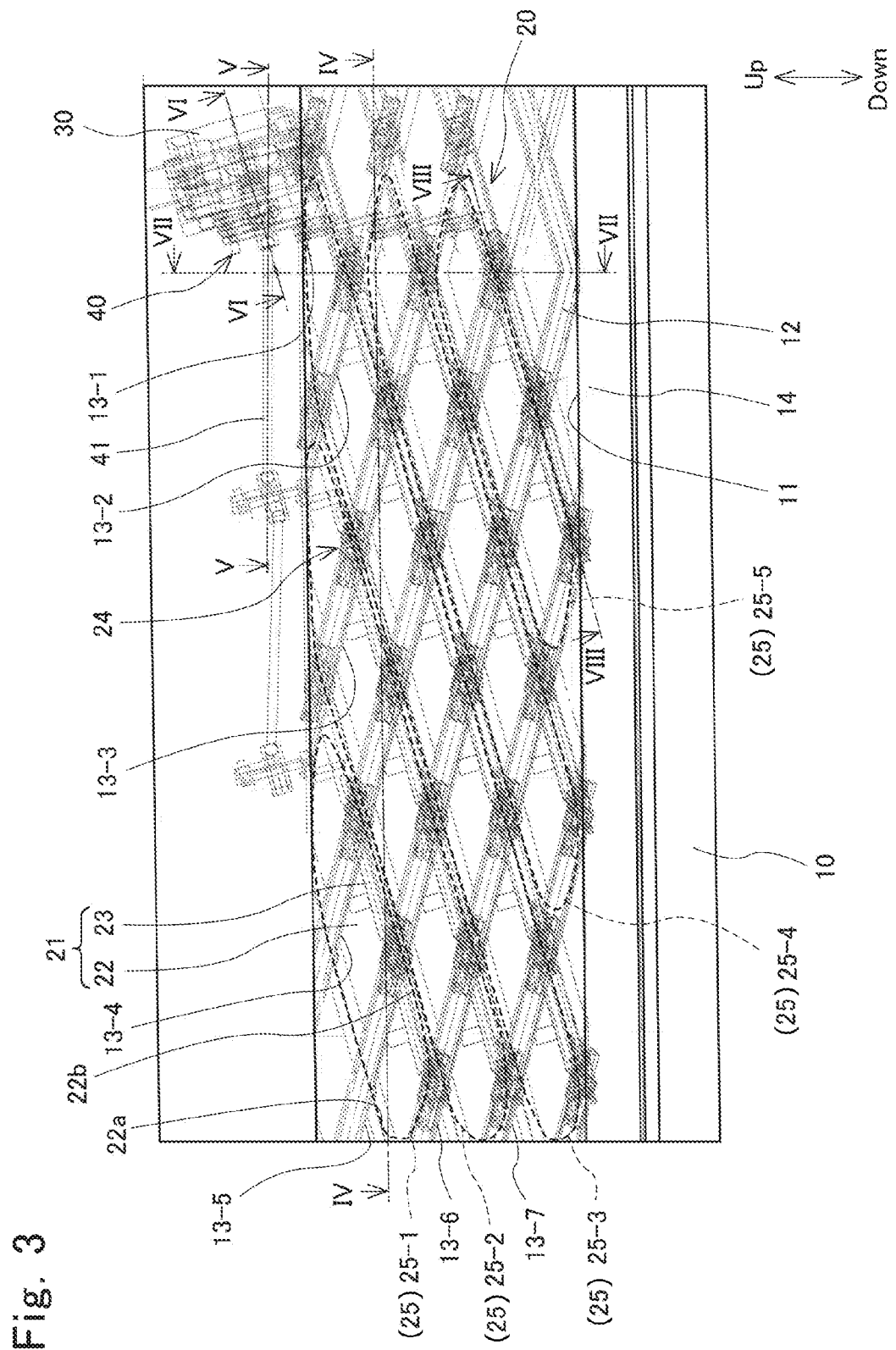
FIG. 3 is a front view of the present vehicular grill shutter device according to Embodiment when viewed on the side of a vehicular front.

The grill 10 is provided with an opening 11 penetrating the grill 10 in the front/rear direction. The opening 11 elongates in the vehicular width direction, and is formed as a substantially rectangular shape as shown in FIG. 3. Note that the opening 11 is satisfactorily cut at the corners of the rectangular shape so as to enable the shutter 20, which will be detailed later, to open and close the opening 11. Note that framework members 12 divide the opening 11 into a plurality of opening holes 13.

The framework members 12 are a plate-shaped member extending linearly. The framework members 12 are fixed to a base frame 14 for forming the opening 11 in the grill 10. Note that the framed member 10 is satisfactorily molded integrally with the grill 10. The framework members 12 are arranged so as to locate one of the vehicular-width-direction opposite ends up above and locate the other one of them down below. That is, the framework members 12 are arranged so as to incline at a predetermined angle in the up/down direction between the vehicular-width-direction opposite ends. Note that FIG. 3 illustrates the framework members 12 that incline from the upper left side down to the lower right side. Moreover, the multiple framework members 12 are disposed to line up parallel to each other.

Each of the opening holes 13 in the opening 11 penetrates the grill 10 in the front/rear direction. The opening holes 13 are a hole, which is formed in a strip shape while being enclosed by the frame 14 and framework members 12, respectively. The opening holes 13 incline at a predetermined angle in the up/down direction between the vehicular-width-direction opposite ends. The multiple opening holes 13 line up parallel to each other by way of the framework members 12. Note that FIG. 3 illustrates the grill 10 provided with the opening holes 13 that line up parallel to each other in a quantity of seven. In the drawing, the opening holes 13 are specifically labeled as "13-1," "13-2," "13-3," "13-4," "13-5," "13-6" and "13-7," respectively, in this order from the uppermost one to the lowermost one. Moreover, a direction in which each of the opening holes 13 extends in a strip shape will be hereinafter referred to as a "hole longitudinal direction," and another direction in which the multiple openings 13 line up will be hereinafter referred to as "hole neighboring direction," respectively. The hole longitudinal direction involves both of the vehicular width direction and up/down direction. Moreover, the hole neighboring direction also involves both of the vehicular width direction and up/down direction, but makes a direction that is right/left symmetric with respect to the hole longitudinal direction when the grill 10 is viewed on the vehicular front side.

The shutter 20 is an opening/closing device that is capable of opening and closing the opening holes 13, and eventually the whole opening 11, when actuated. The shutter 20 includes multiple blade-shaped fins 21. The fins 21 are constructed to be able to close down the area of the opening 11 entirely. The fins 21 are disposed for the opening holes 13 one by one so that they are arranged to line up in the hole longitudinal direction. The fins 21 are formed as an arc configuration curving in the front/rear direction to fit into a curved configuration of the grill 10. The fins 21 are molded of resin. The fins 21 are formed to make a diamond shape when viewed on the vehicular front side. The fins 21 are made to be capable of rotating between two positions, namely, a close-down position at which they close down the opening holes 13 in the opening 11 and an open-up position at which they open up the opening holes 13 in the opening 11.

Each of the fins 21 includes a body plate 22, and a support shaft 23. The body plate 22 is formed in a diamond shape. The diamond shape of the body plate 22 makes a curved face coinciding with a configuration of the opening holes 13 of the opening 11 in the grill 10. The fins 21 are arranged one by one for each of the opening holes 13 so as to line up in the hole longitudinal direction of the opening holes 13. The body plate 22 of a first of the fins 21 is arranged obliquely to the body plate 22 of a second of the fins 21, which lines up to follow or neighbor in the hole longitudinal direction in identical one of the opening holes 13, in such a manner that one of the sides of the diamond shape of the first body plate 22, and one of the sides of the diamond shape of the second body plate 22 neighbor one another. Moreover, in identical one of the opening holes 13, the body plate 22 of one of the fins 21 not only neighbors the body plate 22 of another one of the fins 21, which is arranged obliquely upward, on the side of an obliquely-leftward upper side 22a of the diamond shape, but also neighbors the body plate 22 of still another one of the fins 21, which is arranged obliquely downward, on the side of an obliquely-rightward lower side 22b of the diamond shape, when viewed on the vehicular front side. In addition, the fins 21, which line up to neighbor one another in the hole longitudinal direction in identical one of the opening holes 13, form a minor clearance between them.

The support shaft 23, which makes the rotational center of the fins 21, is a shaft with a circular shape in the cross section. The support shaft 23 is fixed to the body plate 22. The support shaft 23, which is arranged so as to come along the side 22b, extends in a direction which links linearly between the vehicular-width-direction opposite ends of the side 22b. The support shaft 23 divides each of the opening holes 13, in which one of the fins 12 including the support shaft 23 is arranged, into two regions, namely, an obliquely leftward upper region and an obliquely rightward lower region, when viewed on the vehicular front side. The support shaft 23 is arranged so as to incline at an angle that makes it right/left symmetric with respect to the angle at which the framework members 12 of the grill 10 incline.

Figure 4:
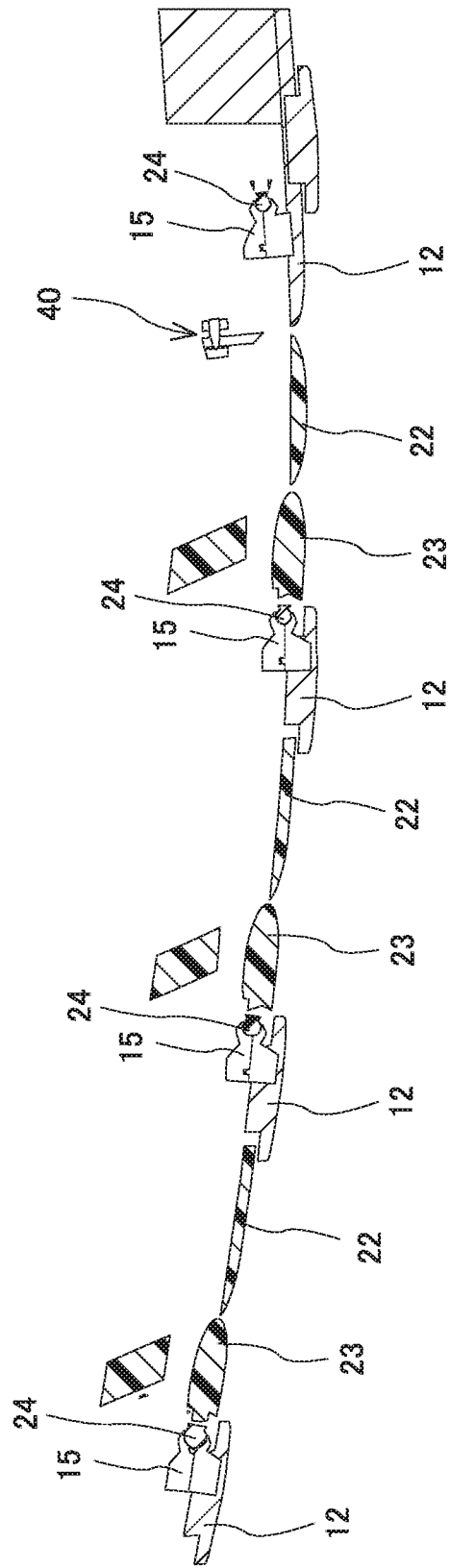
FIG. 4 is a cross-sectional view of the present vehicular grill shutter device according to Embodiment when cut along the line "IV"-"IV" shown in FIG. 3.

The support shaft 23 has a predetermined axial length. The predetermined axial length is set up to such an extent of separation distance in which two of the framework members 12, which neighbor one another in the hole neighboring direction to form one of the opening holes 13 for accommodating one of the fins 21, separate from one another in the inclination direction in which the support shaft 23 of one of the fins 21 extends. As illustrated in FIG. 4, bearings 15, with which the grill 10 is provided, support the opposite ends of the support shafts 23 rotatably. The bearings 15 are installed on the back-face side of the framework members 12, namely, on the rear-face side, respectively. The fins 12, which rotate about the rotational center, namely, about the support shafts 23 supported by the bearings 15, are capable of opening and closing the opening holes 13. The body plate 22 of the fins 21, which rotates about the support shaft 23 so as to fall over backward, enables the fins 21 to open up the opening holes 13.

The fins 21 are constructed so that each of the support shafts 23 connects one of the fins 12, which is arranged in a first of the opening holes 13, with another one the fins 21 that is arranged in a second of the opening holes 13 neighboring the first of the opening holes 13 in the hole neighboring direction, and so on. The shutter 20 further includes universal joints 24 joining the support shafts 23 of the fins 21 to each other. The universal joints 23 are made of a joint, which is capable of transmitting an axial rotation around one of the support shafts 23 to the other one of the support shafts 23 while making a relative angle variable between the two support shafts 23 joined to one another, respectively.

Figure 8:
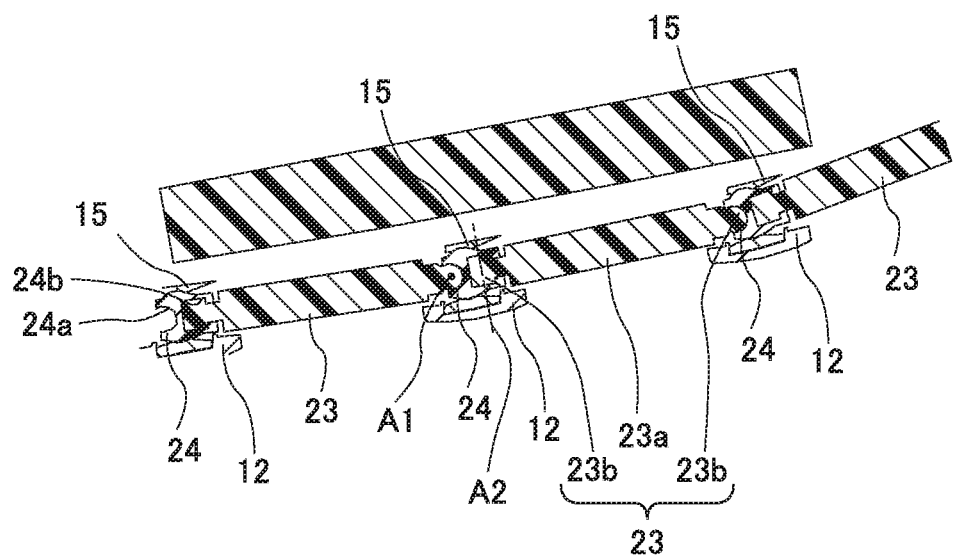
FIG. 8 is a cross-sectional view of the present vehicular grill shutter device according to Embodiment when cut along the line "VIII"-"VIII" shown in FIG. 3.

The opposite ends of the support shaft 23 are formed as a configuration which is capable of converting the axial rotations around the support shaft 23 into the rotations of the universal joint 24, and which allows the rotations of the support shaft 23 relative to the universal joint 24, or to its first axis "A1" or second axis "A2" shown in FIG. 8 specifically. As illustrated in FIG. 8, the support shaft 23 includes an axial body 23a making the axial center, and paired connectors (23b, 23b) disposed at the axial opposite ends. The axial body 23a is a cross-sectionally circle-shaped site making the axial body of the support shaft 23. For example, the connectors (23b, 23b) are a cylinder-shaped site, which joins integrally to the axial body 23a, respectively. The connectors (23b, 23b) have a cylindrical or columnar body, whose axis extends perpendicularly to the axial direction of the axial body 23a, respectively. The support shaft 23 is formed so that the respective connectors (23b, 23b) disposed at the axial opposite ends have cylindrical or columnar axes extending in directions which differ from one another by 90 degrees.

The universal joint 24 is supported rotatably by the bearing 15 installed on the rear-face side of the framework members 12. Note that the universal joint 24 is also held satisfactorily swingable to the bearing 15. For example, the universal joint 24 is made of a spherical body formed in a substantially spherical shape. The universal joint 24 includes a first support bore 24a, and a second support bore 24b. The first support bore 24a is made of a cylinder-shaped bore whose axis extends in a direction coinciding with the extending direction of the first axis "A1." The second support bore 24b is made of a cylinder-shaped bore whose axis extends in a direction coinciding with the extending direction of the second axis "A2." The universal joint 24 is formed so that the respective support bores (24a, 24b) have axes extending in directions which differ from one another by 90 degrees. The first bore 24a engages with the connector 23b at one of the opposite ends of the support shaft 23. The second bore 24b engages with the connector 23b at another one of the opposite ends of the support shaft 23.

In a direction in which the support shafts 23 of the two fins 21 join to one another via the universal joint 24, one of the support shafts 23a of the other fin 21 is further joinable in series via the universal joint 24. Hereinafter, a group of the fins 21, in which a plurality of the fins 21 join to each other in series via the universal joints 24, will be referred to as a fin row 25 collectively. The fin row 25 extends as a whole in the vehicular width direction while the support shafts 23 of the two fins 21, which neighbor in the vehicular width direction, curve each other to fit into a curved configuration of the grill 10 via the universal joints 24. The fin row 25 is arranged or provided in multiple rows lining up in the hole longitudinal direction of the opening holes 13. Moreover, the multiple fin rows 25, which line up in the hole longitudinal direction of the opening holes 13, satisfactorily include the constituent fins 21 in different quantities to each other.

Note that FIG. 3 illustrates the present vehicular grill shutter device according to Embodiment comprising the fin row 25 in five rows. In the drawing, the five fin rows 25 are labeled fin rows (25-1, 25-2, 25-2, 25-3, 25-4, 25-5) in this order from the uppermost fin row 25 to the lowermost fin row 25. Moreover, the drawing illustrates the fin rows (25-1, 25-2, 25-2, 25-3, 25-4, 25-5) having the constituent fins 21 in a quantity of three, five, seven, five, and three, respectively.

All the directions in which the respective support shafts 23 of the multiple fins 21 constituting the fin rows 25 are not necessarily coincide with each other. The support shafts 25 may extend linearly when viewed on the vehicular front side, but they extend in different directions for the respective universal joints 24 to fit into a configuration of the grill 10 at slightly displaced angles to each other starting at the universal joints 24 when viewed on the vehicular upper side. Note that each of the displaced angles satisfactorily differs for every one of the universal joints 24. Moreover, the displaced angles are allowed to differ from each other when the opening 11 is closed, and when it is opened.

The multiple fins 21 and universal joints 24, which line up in the hole neighboring direction to constitute the fin rows 25, are molded by two-color molding. Specifically, a resin for molding the fin rows 25 is first flowed into a mold which is provided with a cavity hollowed out to copy the fin rows 25, molding all of the fins 21 constituting the fin rows 25. Thereafter, another resin for molding the universal joints 24 between the two fins 21 is then flowed into the mold which is provided with another cavity hollowed out to copy the universal joints 24, molding the universal joints 24 whose support bores (24a, 24b) engage with the connectors (23b, 23b) formed at the opposite ends of the support shaft 23 of the fins 21. The two-color molding for the fins 21 and universal joints 24 is carried out for each of the fin rows 25. The fins 21 and universal joints 24, which are thus integrated for each of the fin rows 25, are assembled with the grill 10 to serve as the shutter 20.

Figure 5:
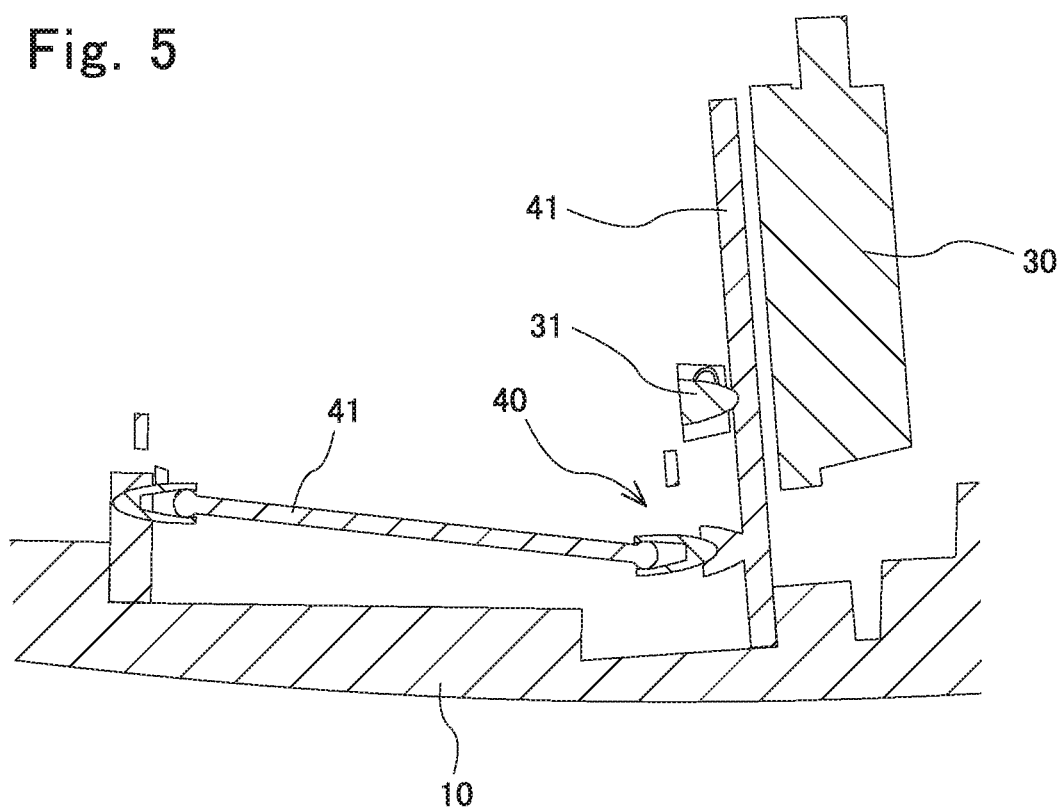
FIG. 5 is a cross-sectional view of the present vehicular grill shutter device according to Embodiment when cut along the line "V"-"V" shown in FIG. 3.
Figure 6:
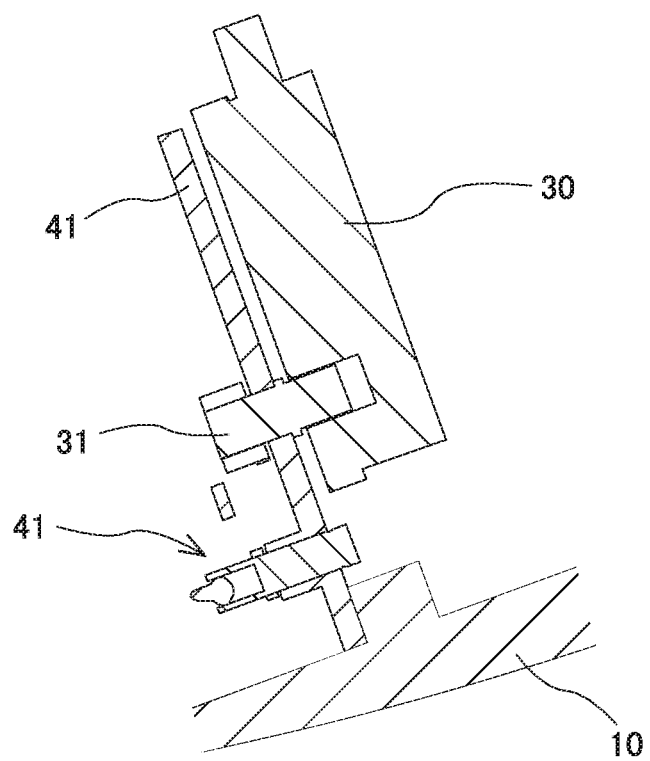
FIG. 6 is a cross-sectional view of the present vehicular grill shutter device according to Embodiment when cut along the line "VI"-"VI" shown in FIG. 3.

The drive source 30 is an actuator for driving the shutter 20, and is made of an electric motor, for instance. The present vehicular grill shutter device according to Embodiment comprises the drive source 30 in a quantity of one. For example, the drive source 30 is installed on one of the vehicular-width-direction opposite sides of the opening 11 in the grill 10. As illustrated in FIGS. 5 and 6, the drive source 30 includes an output shaft 31 joined to all of the fins 21 via a link mechanism 40. The drive source 30 is capable of rotating all of the fins 21 between the close-down position and the open-up position.

Figure 7:
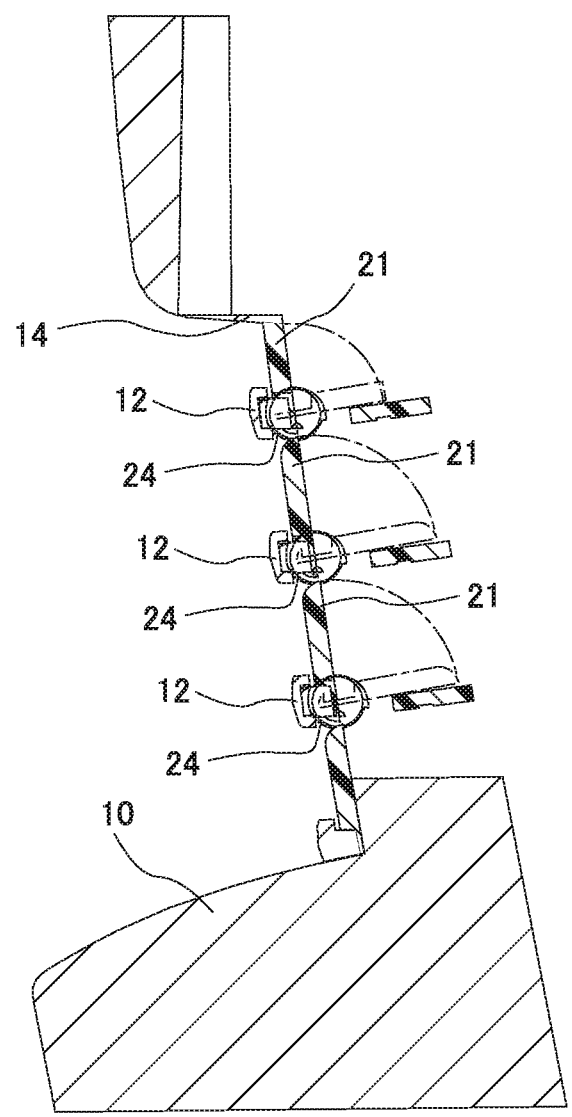
FIG. 7 is a cross-sectional view of the present vehicular grill shutter device according to Embodiment when cut along the line "VII"-"VII" shown in FIG. 3.

The link mechanism 40 includes an arm 41 corresponding to each of the fin rows 25. The arm 41 joins the output shaft 31 of the drive source 30 to one of the constituent fins 21 of the fin rows 25, for instance, to one of the fins 21 on the side of one of the vehicular-width-direction opposite ends of the fin rows 25. The rotations of the drive source 30, which the link mechanism 40 transmits by way of the arm 41, rotate the respective fins 21 of the fin rows 25 about the support shafts 23 between the close-up position and the open-up position as shown in FIG. 7.

(2) OPERATIONS OF GRILL SHUTTER DEVICE FOR VEHICLE

When a passenger makes a request to the present vehicular grill shutter device 1 according to Embodiment to close the opening 11 in the grill 10, the drive source 30 rotates in the direction of closing down the opening 11. When the drive source 30 rotates in the close-down direction (hereinafter referred to as a "closing rotation"), the link mechanism 4 transmits the closing rotation of the drive source 30 to the support shafts 23 of the fins 21 at one of the vehicular-width-direction furthermost opposite ends in the respective fin rows 25. When the link mechanism 4 transmits the closing rotation of the drive source 30 to the support shafts 23 of the fins 21 at one of the vehicular-width-direction furthermost opposite ends in the respective fin rows 25, the universal joints 24 transmit the closing rotation from the fins 21 to the support shafts 23 of the neighboring fins 23, which are present on the side of another one of the vehicular-width-direction opposite ends of the former fins 21, and keep transmitting the closing rotation until the transmission reaches the last fins 21 at another one of the vehicular-width-direction furthermost opposite ends in the fin rows 25. Even when the shutter 20 is constructed to include three or more of the fins 21 joining to each other in series via the universal joints 24, the transmission is carried out immediately between the three-or-more fins 21.

All of the fins 21 in the respective fin rows 25 join to the neighboring fins 21, which come before or after them, via the universal joints 24 in the vehicular width direction, or in the hole neighboring direction specifically. Accordingly, the closing rotation of the drive source 30 is transmitted virtually simultaneously from the fins 21, which are present on the side of one of the vehicular-width-direction opposite ends in the fin rows 25, to the other fins 21, which are present on the side of another one of the vehicular-width-direction opposite ends in the fin rows 25. When the closing rotation of the drive source 30 is transmitted to the fins 21 in the fin rows 25, the body plates 22 of the respective fins 21 rotate about the support shafts 23 so as to rise up, closing down the opening 11 eventually. The fins 21 rotate virtually simultaneously in all of the fin rows 25. Thus, the fins 21 close down the opening 11 in the grill 10.

Moreover, when a passenger makes another request to the present vehicular grill shutter device 1 according to Embodiment to open the opening 11 in the grill 10, the drive source 30 rotates in the direction of opening up the opening 11. When the drive source 30 rotates in the open-up direction (hereinafter referred to as an"opening rotation"), the link mechanism 4 transmits the opening rotation of the drive source 30 to the support shafts 23 of the fins 21 at one of the vehicular-width-direction furthermost opposite ends in the respective fin rows 25. When the link mechanism 4 transmits the opening rotation of the drive source 30 to the support shafts 23 of the fins 21 at one of the vehicular-width-direction furthermost opposite ends in the respective fin rows 25, the universal joints 24 transmit the opening rotation from the fins 21 to the support shafts 23 of the neighboring fins 23, which are present on the side of another one of the vehicular-width-direction opposite ends of the former fins 21, in the same manner as the closing rotation described above, and keep transmitting the opening rotation until the transmission reaches the last fins 21 at another one of the vehicular-width-direction furthermost opposite ends in the fin rows 25. Even when the shutter 20 is constructed to include three or more of the fins 21 joining to each other in series via the universal joints 24, the transmission is carried out immediately between the three-or-more fins 21.

The opening rotation of the drive source 30 is transmitted virtually simultaneously from the fins 21, which are present on the side of one of the vehicular-width-direction opposite ends in the fin rows 25, to the other fins 21, which are present on the side of another one of the vehicular-width-direction opposite ends in the fin rows 25. When the opening rotation of the drive source 30 is transmitted to the fins 21 in the fin rows 25, the body plates 22 of the respective fins 21 rotate about the support shafts 23 so as to fall over backward, opening up the opening 11 eventually. The fins 21 rotate virtually simultaneously in all of the fin rows 25. Thus, the fins 21 open up the opening 11 in the grill 10.

(3) ADVANTAGEOUS EFFECTS OF GRILL SHUTTER DEVICE FOR VEHICLE

As described above, the present vehicular grill shutter device 1 according to Embodiment comprises the shutter 21 whose multiple fins 21 line up in the vehicular width direction, or in the hole neighboring direction specifically, to fit into a curved configuration of the grill 10. Moreover, not only the entire fin rows 25 extend in the vehicular width direction while flexing or bending the support shafts 23 of the two fins 21, which neighbor in the vehicular width direction, to each other via the universal joints 24, but also the respective fins 21 are formed to have an arc configuration, which curves in the front/rear reaction to fit into a curved configuration of the grill 10, at the close-down position. In addition, the present vehicular grill shutter device 1 further comprises the drive source 30 whose output shaft 31 is joined to the respective fins 21 via the link mechanism 40. The thus constructed present vehicular grill shutter device 1, which uses the link mechanism 40 actuated by the single drive source 30 and the universal joints 21, allows driving all of the fins 21 in the fin rows 25 simultaneously to open and close the opening 11 in the grill 10.

Moreover, the present vehicular grill shutter device 1 according to Embodiment comprises the universal joints 24 which join the support shafts 23 of the fins 21 to each other, and which are supported rotatably by the bearings 15 installed on the rear-face side of the framework members 12 of the grill 10. The universal joints 24 engage with both of the connectors (23b, 23b) which are disposed at the opposite ends of the support shafts 23 of the respective fins 21. Accordingly, the respective fins 21 rotate about the support shafts 23, with which the universal joints 24 engage, to open and close the open holes 13 of the opening 11 in the grill 10. In this instance, the respective fins 21 rotate about the support shafts 23 to open and close the opening holes 13 virtually free of positionally moving the support shafts 23 relative to the grill 10, and virtually free of angularly displacing them.

Consequently, when the shutter 20 thus operates to open up the opening 11 in the grill 10, the body plates 22 of the fins 21 come to have a curved face which curves in an upwardly convexed manner when viewed on the vehicular front side. However, each of the body plates 23 of the respective fins 21 comes to be located so as to hide behind the rear face of the support shafts 23, because the fins 21 of the shutter 20 turn into a multi-joint structure using the universal joints 24. Accordingly, the multi-joint structure makes the curved configuration of the body plates 22 less likely to see through the opening 11. Therefore, the multi-joint structure allows upgrading the looking or appearance of the fins 21, which curve to fit into a configuration of the grill 10, when they open up the opening 11 in the grill 10. Thus, the multi-joint structure permits materializing grills with expressions designed or decorated finely.

That is, the present vehicular grill shutter device 1 according to Embodiment comprises the grill 10, the shutter 20, and the drive source 30. The grill 10 is arranged at the vehicular front 2 in a curved manner, and is provided with the opening 11 penetrating the grill 10 in the front/rear direction. The shutter 20 includes the multiple fins 21 opening and closing the opening 11, lining up in the vehicular width direction, and curving to fit into a curved configuration of the grill 10. The drive source 30 actuates the shutter 20 so that the fins 21 open and close the opening 11. Each of the fins 21 includes the body plate 22, and the support shaft 23. The plate body 22 is formed as a configuration coinciding with a configuration of a corresponding site in the opening 11. The support shaft 23 is fixed to the body plate 22, extends in a direction which linearly connects between vehicular-width-direction opposite ends of the corresponding site in the opening 10, and is supported to the grill 10 so as to rotate when actuated by the drive source 30. The shutter 20 further includes the universal joints 24. The universal joints 24 join between the support shafts 23 of two of the fins 21 which neighbor one another in the vehicular width direction.

The present vehicular grill shutter device 1 according to Embodiment constructed as described above enables each of the fins 21 to rotate about each of the support shafts 23 of the fins 21 to open and close the opening 11 in the grill 10 virtually free of moving the support shafts 23 positionally, or virtually free of displacing them angularly, relative to the grill 10. In this instance, the fins 21 of the shutter 20 turn into a multi-joint structure using the universal joints 24. Accordingly, the resultant multi-joint structure allows each of the fins 21, which are even curved to fit into a curved configuration of the grill 10, to be located so as to hide behind on the rear-face side of the support shafts 23 when they open up the opening 11. Therefore, the multi-joint structure permits upgrading the fins 21, which are curved to fit into the curved configuration of the grill 10, in the looking or appearance when they open up the opening 11 in the grill 10.

Moreover, the present vehicular grill shutter device 1 according to Embodiment comprises the shutter 20 including three or more of the fins 21 which join to each other in series in the vehicular width direction via the universal joints 24. The thus constructed shutter 20 allows transmitting rotations, which the drive source 30 produces, to the three or more of the fins 21 immediately. Accordingly, the shutter 20 enables the three or more fins 21 to rotate to open and close the opening 11 in the grill 10, respectively, without virtually moving the support shaft 23 of each of the fins 21 positionally relative to the grill 10. Consequently, the shutter 20 permits upgrading the fins 21, each of which is even curved to fit into a curved configuration of the grill 10, in the looking or appearance when they open up the opening 11 in the grill 10.

In addition, the present vehicular grill shutter device 1 according to Embodiment comprises the drive source 30 whose output shaft 31 is connected with the support shaft 23 of one of the fins 21 arranged at either one of the vehicular-width-direction opposite ends of the shutter 20. The thus constructed present vehicular grill shutter device 1 allows transmitting rotations, which the drive source 30 produces, to the other fins 21 which neighbor on another one of the opposite sides of the one of the fins 21 arranged at the one of the vehicular-width-direction opposite ends of the shutter 20, one after another after transmitting the rotations to the one of the fins 21. Accordingly, the use of the single drive source 30 alone enables the respective fins 21 to open and close the opening 11 in the grill 10.

Moreover, the vehicular present grill shutter device 1 according to Embodiment comprises the bearings 15 fixed to the grill 10, and making the universal joints 24 rotatable relative to the grill 10. The thus constructed present vehicular grill shutter device 1 allows rotating the support shaft 23 of the respective fins 21 together with the universal joints 23 while letting the universal joints 24 support the support shafts 23 at one of the opposite ends by way of the bearings 15. Thus, the bearings 15 enable the respective fins 21 to rotate to open and close the opening 11 in the grill 10 without moving the support shaft 23 of each of the fins 21 positionally relative to the grill 10.

In addition, the present vehicular grill shutter device 1 according to Embodiment comprises the fins 21 lining up one after another in the vehicular width direction, and the universal joints 24, both of the fins 21 and universal joints 24 formed by two-color molding. The thus constructed present vehicular grill shutter device 1 allows readily manufacturing the fins 21 and universal joints 24, the constituent elements of the shutter 20. Thus, the present vehicular grill shutter device 1 permits simple and inexpensive assemblage of the shutter 20 with the grill 10.

Moreover, the present vehicular grill shutter device 1 according to Embodiment comprises the shutter 20 including the multiple fin rows 25 which line up in the up/down direction, and in which the multiple fins 21 line up in the vehicular width direction. The thus constructed shutter 20 allows keeping down the up/down dimension of the fins 25 smaller in each of the fin rows 25, because the multiple fin rows 25, in which the multiple fins 21 line up in the vehicular width direction, line up one after another in the up/down direction. Accordingly, the shutter 20 permits keeping down the width or area, which the fins 25 occupy in the front/rear direction, smaller when the fins 21 rotate to open the opening 11 in the grill 10. Consequently, the shutter 20 allows avoiding or inhibiting dead spaces required for opening and closing the fins 21 from widening or expanding excessively.

(4) MODIFIED EMBODIMENTS

First Modified Embodiment

Figure 9:
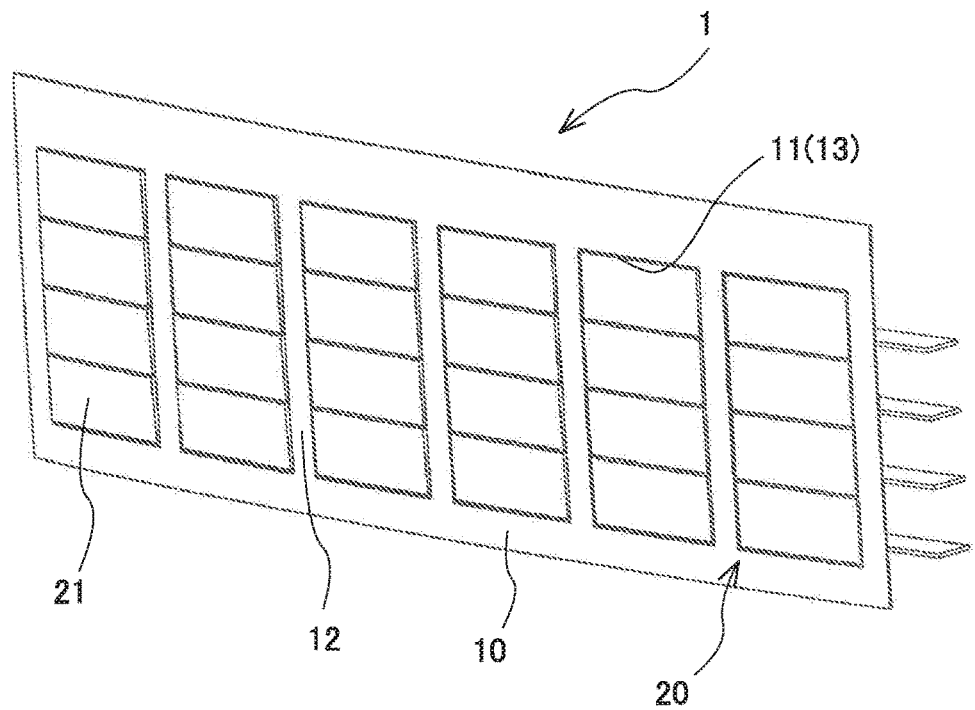
FIG. 9 is a perspective view of a grill shutter device for vehicle according to First Modified Embodiment of the present invention when viewed on the side of a vehicular front, wherein the vehicular grill shutter device is closing the opening in a grill.
Figure 10:
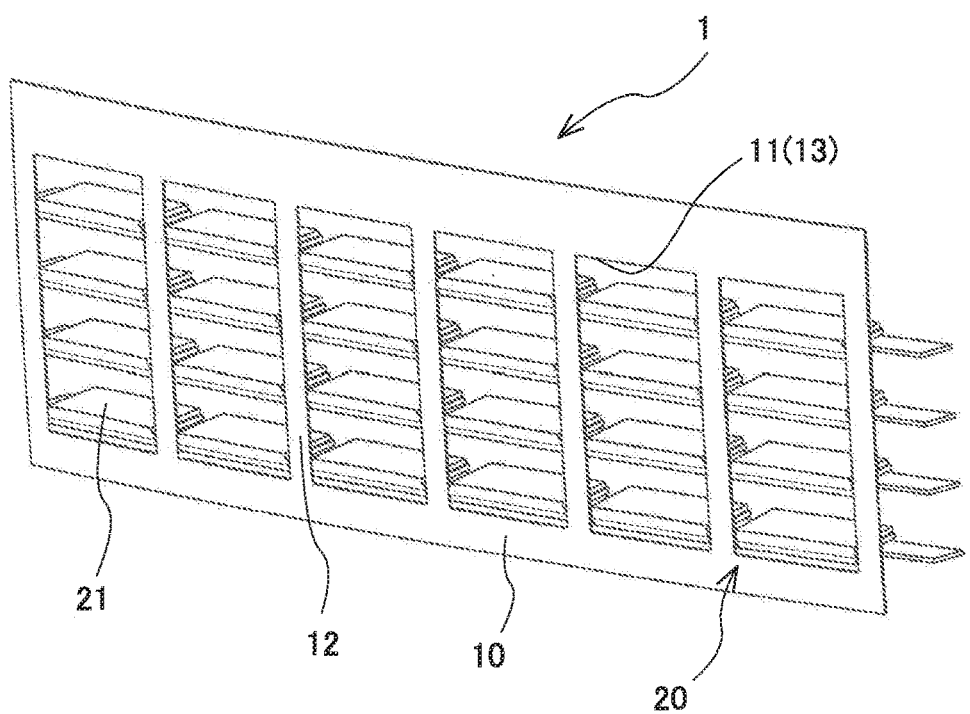
FIG. 10 is a perspective view of the present vehicular grill shutter device according to First Modified Embodiment when viewed on the vehicular front side, wherein the vehicular grill shutter device is opening the opening in the grill.
Figure 11:
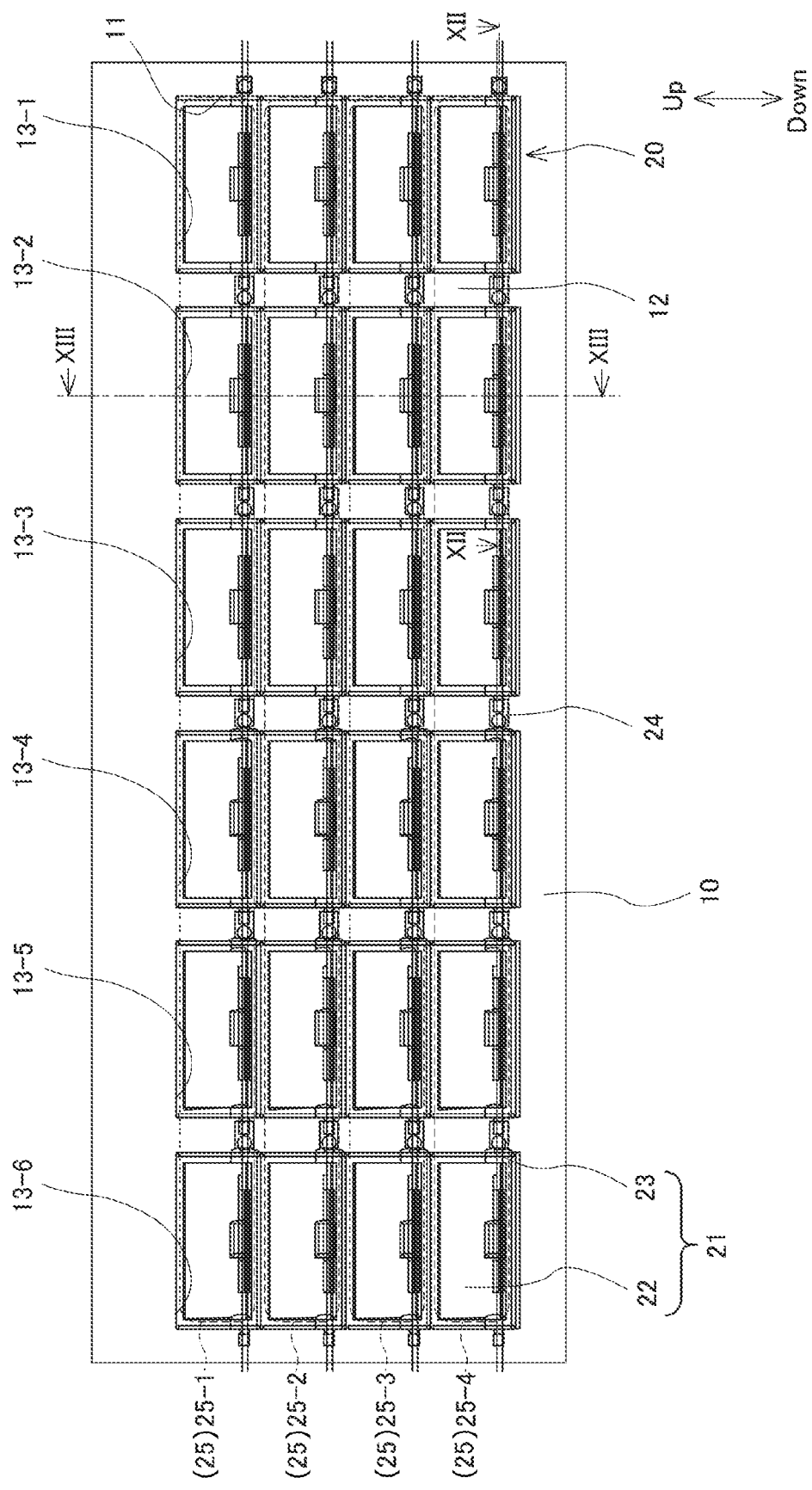
FIG. 11 is a front view of the present vehicular grill shutter device according to First Modified Embodiment when viewed on the vehicular front side.

The above-described present vehicular grill shutter device 1 according to Embodiment comprises the grill 10 whose opening 11 is divided into the multiple opening holes 13 by the framework members 12 slanting upward/downward between the vehicular-width-direction opposite ends. Moreover, the respective opening holes 13 extend while slanting upward/downward between the vehicular-width-direction opposite ends. In addition, the fin rows 25, in which the multiple fins 21 join to each other in the vehicular width direction, extend so as to intersect with the framework members 12, and to be right/left symmetric with respect to them. In contrast, a vehicular grill shutter device 1 according to First Modified Embodiment of the present invention comprises a grill 10 whose opening 11 is divided into a plurality of opening holes 13 by framework members 12 extending in the up/down direction, as shown in FIGS. 9, 10 and 11. Moreover, the present vehicular grill shutter device 1 according to First Modified Embodiment further comprises fin rows 25 in which a plurality of fins 21 join to each other in the vehicular width direction, and which extend in the right/left direction (i.e., the vehicular width direction) perpendicularly to the framework members 12.

The present vehicular grill shutter device 1 according to First Modified Embodiment further comprises a shutter 20 whose fins 21 are constructed to be capable of closing down the opening 11 in the grill 10 over the entire area. The fins 21, which are prepared one by one for each of the opening holes 13, are arranged so as to line up one after another in the up/down direction. The fins 21 are formed as an arc configuration curving to fit into a configuration of the grill 10 in the front/rear direction. The fins 21 are molded of resin. The fins 21 are formed so as to make a rectangular shape when viewed on the vehicular front side. The fins 21 are capable of rotating between a close-down position at which they close down the opening 11, and an open-up position at which they open up the opening 11.

Each of the fins 21 includes a body plate 22, and a support shaft 23. The plate body 22 is formed in a rectangular shape when it is made to have a curved face coinciding with a configuration of a site in the opening holes 13 of the opening 11 in the grill 10. Moreover, the body plate 22 of one of the fins 21 is arranged relative to the body plate 22 of another one of the fins 21, which neighbors in an identical one of the opening holes 13, under such a condition that the top side and bottom side of their rectangular shapes neighbor one another while providing a minor clearance between them.

Figure 13:
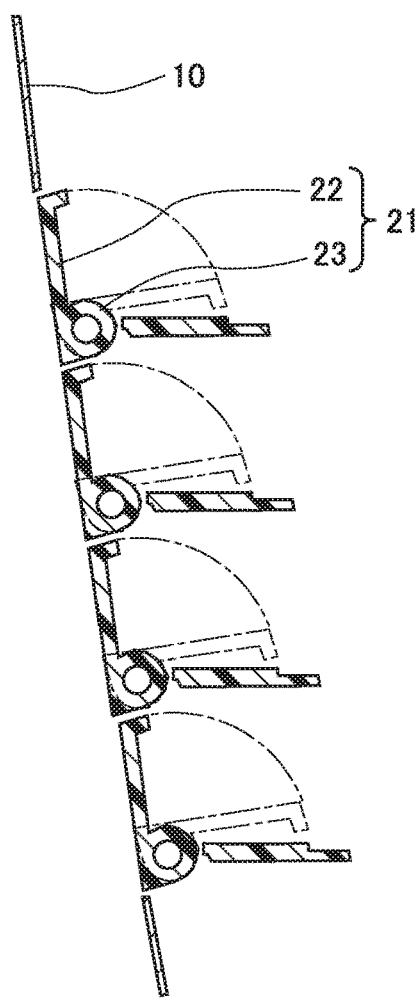
FIG. 13 is a cross-sectional view of the present vehicular grill shutter device according to First Modified Embodiment when cut along the line "XIII"-"XIII" shown in FIG. 11.

The support shaft 23 of each of the fins 12 is a cross-sectionally circle-shaped shaft about which the fins 21 rotate. The support shaft 23 is fixed to the body plate 22. Moreover, the support shaft 23 is formed so as to protrude outward from each of the vehicular-width-direction opposite sides of the plate body 22. In addition, the support shaft 23 is arranged so as to come along an imaginary axial line taken along the bottom side of the plate body 22 in the vehicular width direction. Moreover, the support shaft 23 extends in a direction linking linearly between the vehicular-width-direction opposite ends in the bottom side of the plate body 22. As illustrated in FIG. 13, the fins 21 open up the opening holes 13 when the body plates 22 rotate about the support shafts 23 so as to fall over backward.

Figure 12:
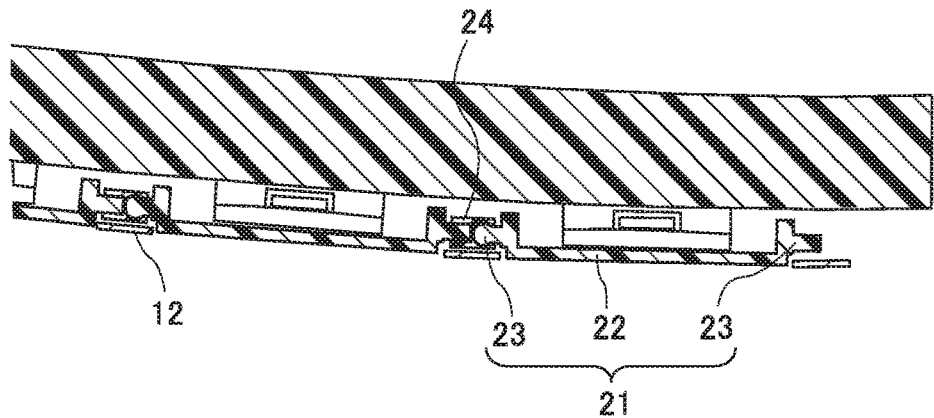
FIG. 12 is a cross-sectional view of the present vehicular grill shutter device according to First Modified Embodiment when cut along the line "XII"-"XII" shown in FIG. 11.

As illustrated in FIG. 12, the fins 21 are constructed so that the support shaft 23 of one of the fins 21, which is arranged in one of the opening holes 13, and the support shaft 23 of another one of the fins 21, which is arranged in another one of the opening holes 13 neighboring the one of the opening holes 13 in the right/left direction, join to one another via one of the universal joints 24. FIGS. 9 through 11 illustrate a fin row 25 including a group of the six-membered fins 21 joining to each other in series via the universal joints 24 in the hole longitudinal direction of the opening holes 13. Moreover, the drawings illustrate a group of the four-membered fin rows 25 arranged so as to line up in the hole latitudinal direction, namely, in the up/down direction.

The respective support shafts 23 of the multiple fins 21, the constituent elements of the fin rows 25, do not necessarily extend in directions all of which coincide with each other. Although the support shafts 23 appear to extend linearly when viewed on the vehicular front side, their extending directions make slightly displaced angles to each other so that they fit into a curved configuration of the grill 10 when viewed on the vehicular upper side. Note that the slightly displaced angles start at a first of the universal joints 24, and are formed between the first universal joint 24 and a second of the neighboring universal joints 24, and so on, when viewed on the vehicular upper side. Moreover, each of the universal joints 24 satisfactorily makes different displaced angles with respect to its two neighboring universal joints 24. In addition, it is admissible that the displaced angles differ from one another between when the fins 21 close the opening 11 in the grill 10 and when they open it.

The thus constructed present vehicular grill shutter device 1 according to First Modified Embodiment also allows producing the same advantageous effects as those produced by the above-described present vehicular grill shutter device 1 according to Embodiment.

Second Modified Embodiment

Figure 14:
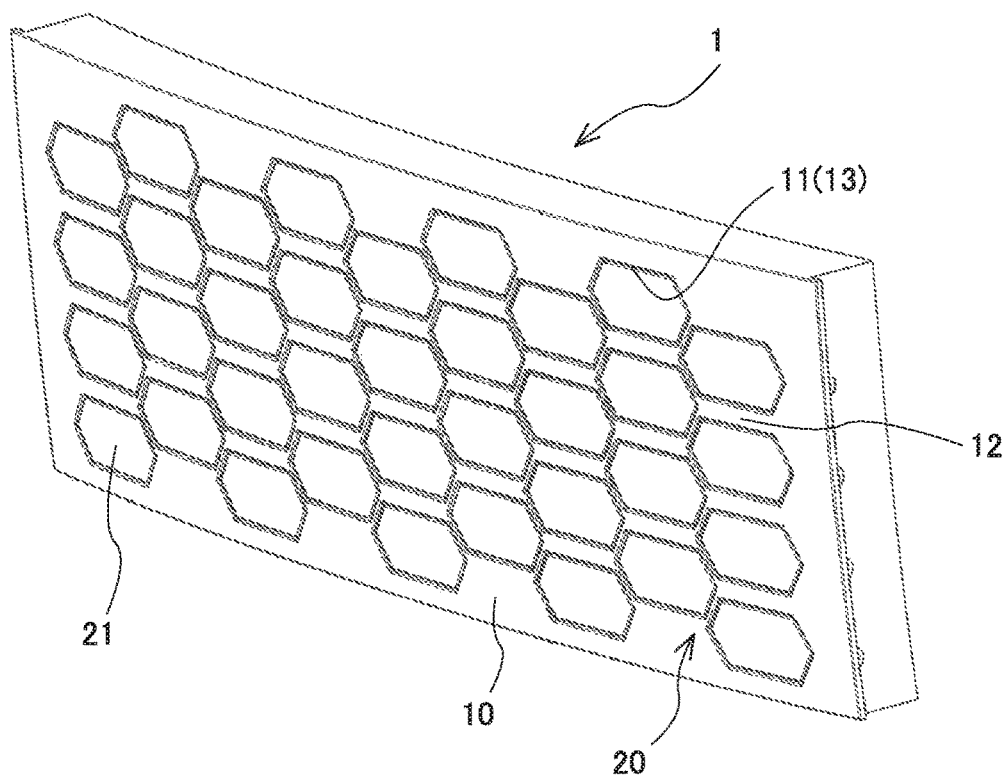
FIG. 14 is a perspective view of a grill shutter device for vehicle according to Second Modified Embodiment of the present invention when viewed on the side of a vehicular front, wherein the vehicular grill shutter device is closing the opening in a grill.
Figure 15:
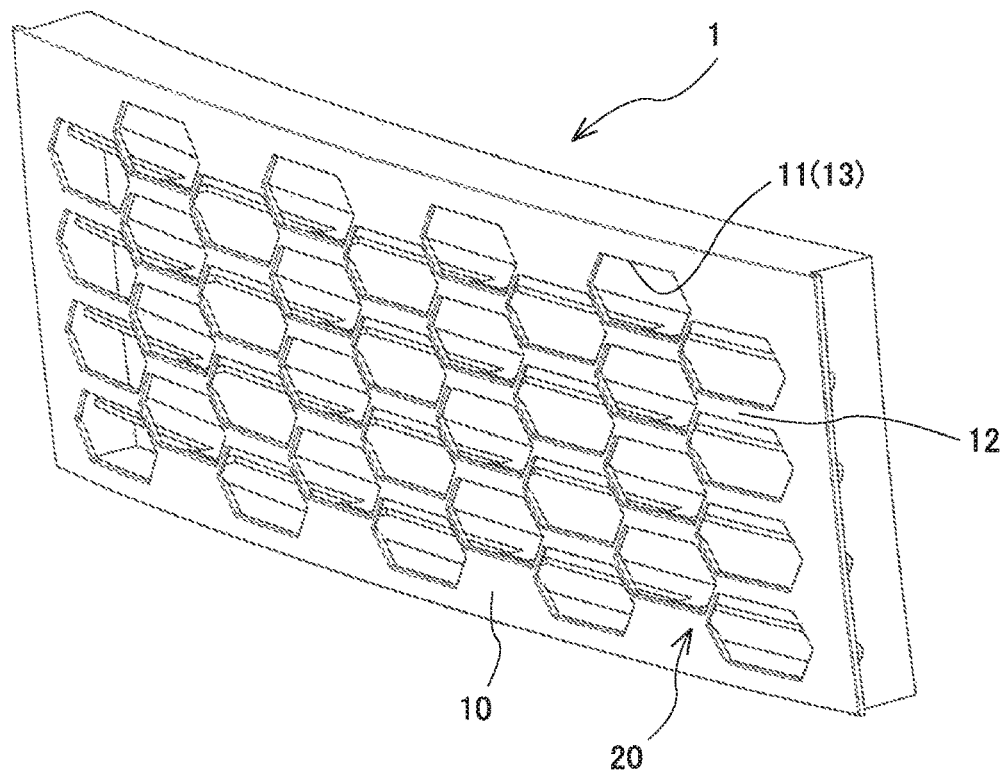
FIG. 15 is a perspective view of the present vehicular grill shutter device according to Second Modified Embodiment when viewed on the vehicular front side, wherein the vehicular grill shutter device is opening the opening in the grill.
Figure 16:
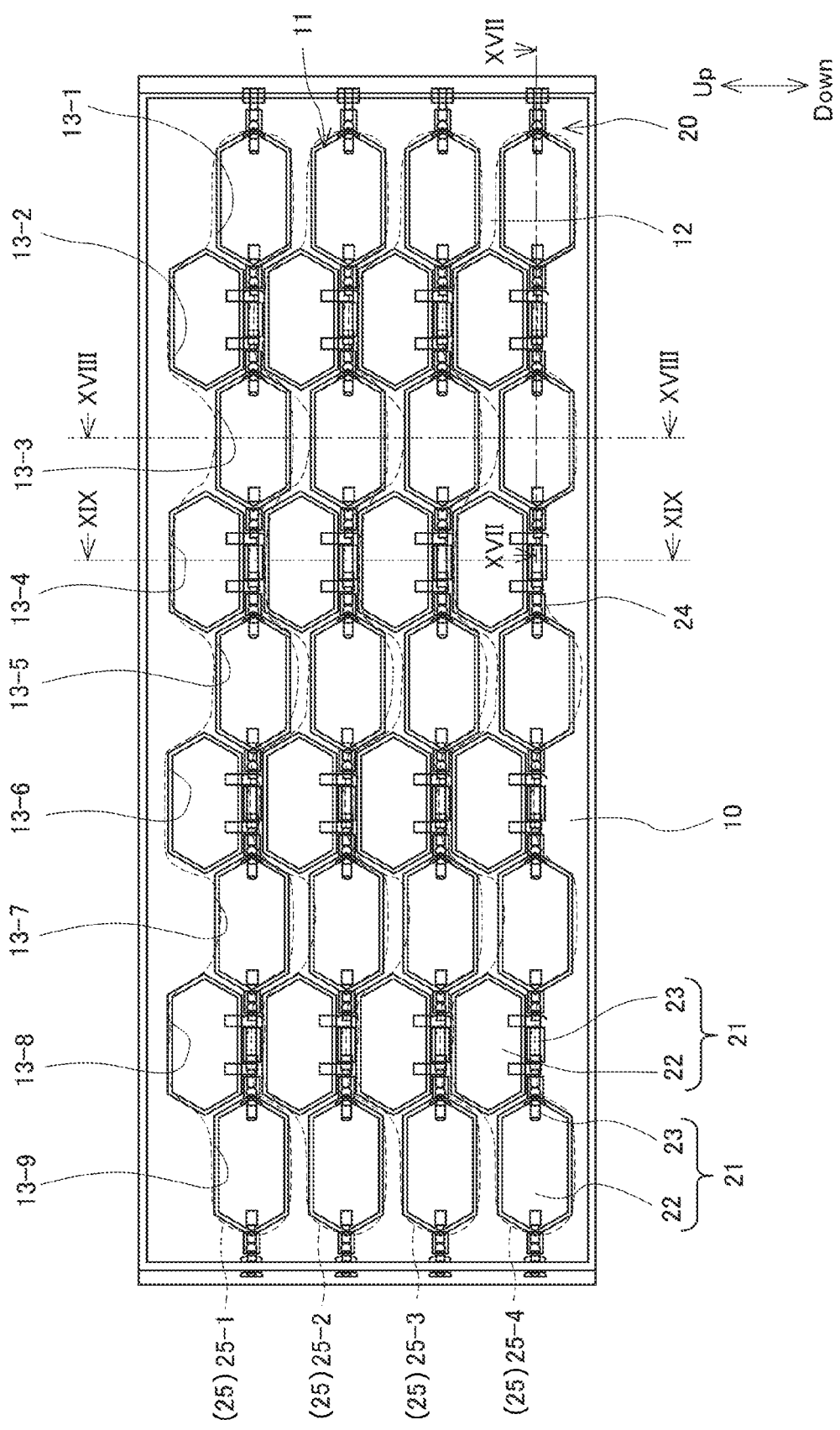
FIG. 16 is a front view of the present vehicular grill shutter device according to Second Modified Embodiment when viewed on the vehicular front side.

Moreover, as illustrated in FIGS. 14, 15 and 16, a vehicular grill shutter device 1 according to Second Modified Embodiment of the present invention comprises a grill 10 whose opening 11 is divided into a plurality of opening holes 13 formed in a hexagonal shape by framework members 12. FIGS. 14 through 16 illustrate the opening holes 13 lining up in the up/down direction in a quantity of four, and those lining up in the vehicular width direction in a quantity of nine. The respective opening holes 13 are arranged obliquely relative to their neighboring opening holes 13 which precede and trail in the vehicular width direction, namely, in a zigzag manner. The multiple opening holes 13, which line up in the vehicular width direction, line up in a triangular-waved shape as whole. Note that FIG. 16 designates the opening holes 13 lining up in the vehicular width direction as "13-1," "13-2," "13-3," "13-4," "13-5," "13-6," "13-7," "13-8" and "13-9" in this order starting at the right.

The present vehicular grill shutter device 1 according to Second Modified Embodiment further comprises a shutter 20 whose fins 21 are constructed to be capable of closing down the opening 11 in the grill 10 over the entire area. The fins 21 are formed as an arc configuration curving to fit into a configuration of the grill 10 in the front/rear direction. The fins 21 are molded of resin. The fins 21 are formed so as to make a hexagonal shape when viewed on the vehicular front side. The fins 21 are capable of rotating between a close-down position, at which they close down the opening 11, and an open-up position, at which they open up the opening 11.

Each of the fins 21 includes a body plate 22, and a support shaft 23. The plate body 22 is formed in a hexagonal shape when it is made to have a curved face coinciding with a configuration of a site in the opening holes 13 of the opening 11 in the grill 10. Moreover, as illustrated in FIG. 17, the body plate 22 of one of the fins 21 is arranged to come adjacent to the body plate 22 of another one of the fins 21 by way of one of the universal joints 14.

Figure 18:
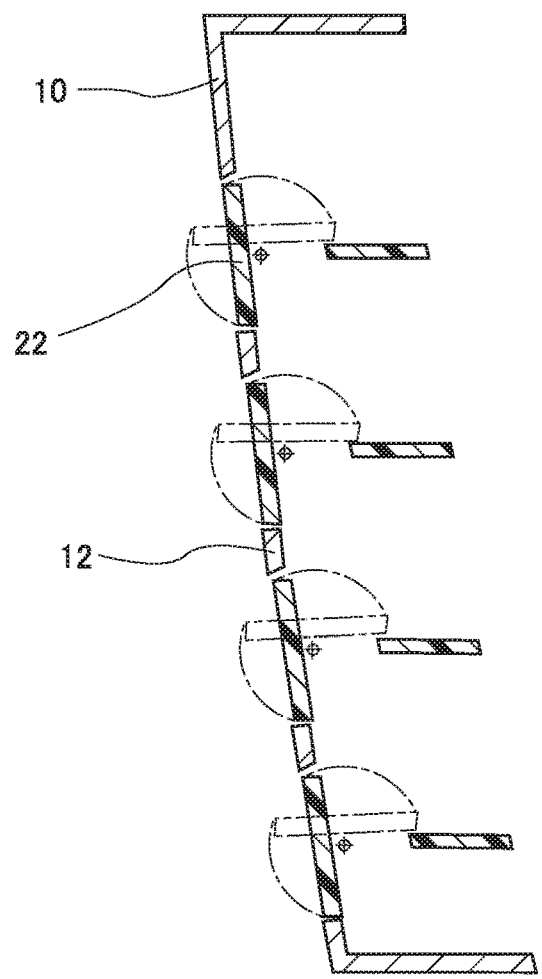
FIG. 18 is a cross-sectional view of the present vehicular grill shutter device according to Second Modified Embodiment when cut along the line "XVIII"-"XVIII" shown in FIG. 16.
Figure 19:
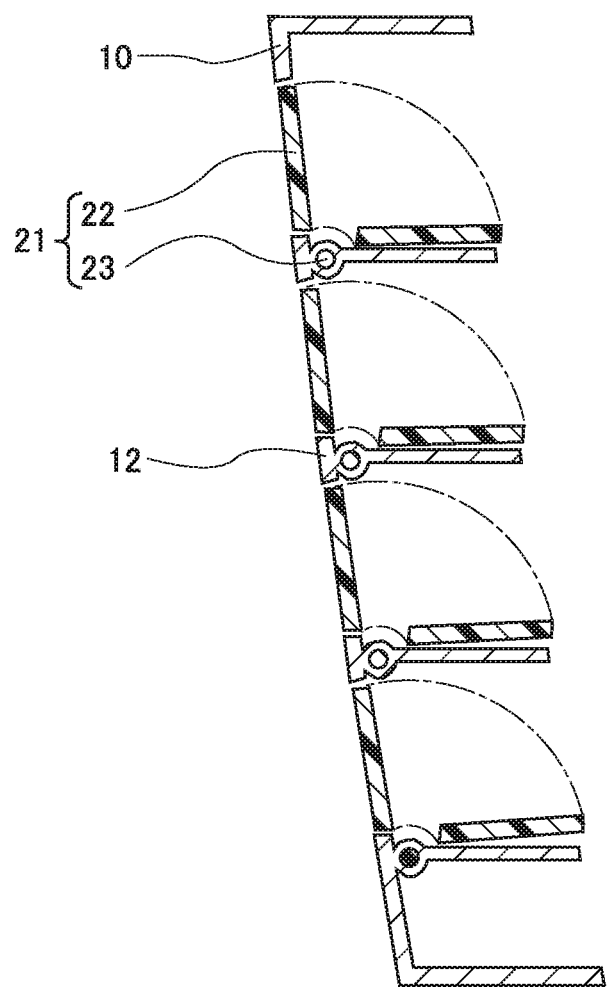
FIG. 19 is a cross-sectional view of the present vehicular grill shutter device according to Second Modified Embodiment when cut along the line "XIX"-"XIX" shown in FIG. 16.

The support shaft 23 of each of the fins 12 is a cross-sectionally circle-shaped shaft about which the fins 21 rotate. The support shaft 23 is fixed to the body plate 22. The support shaft 23 of the fins 12, each of which opens and closes the opening holes (13-1, 13-2, 13-3, 13-4, 13-5, 13-6, 13-7, 13-8, 13-9), is formed so as to protrude outward from each of the vehicular-width-direction opposite sides at the middle in the plate body 22 in the up/down direction. Moreover, the support shaft 23 of the fins 12, each of which opens and closes the opening holes (13-1, 13-2, 13-3, 13-4, 13-5, 13-6, 13-7, 13-8, 13-9), is arranged so as to come along an imaginary axial line taken along the bottom side of the plate body 22 extending in the vehicular width direction. In addition, the support shaft 23 extends in a direction linking linearly between the vehicular-width-direction opposite ends in the bottom side of the plate body 22. As illustrated in FIGS. 18 and 19, the fins 21 open up the opening holes 13 when the body plates 22 rotate about the support shafts 23 so as to fall over backward.

Figure 17:
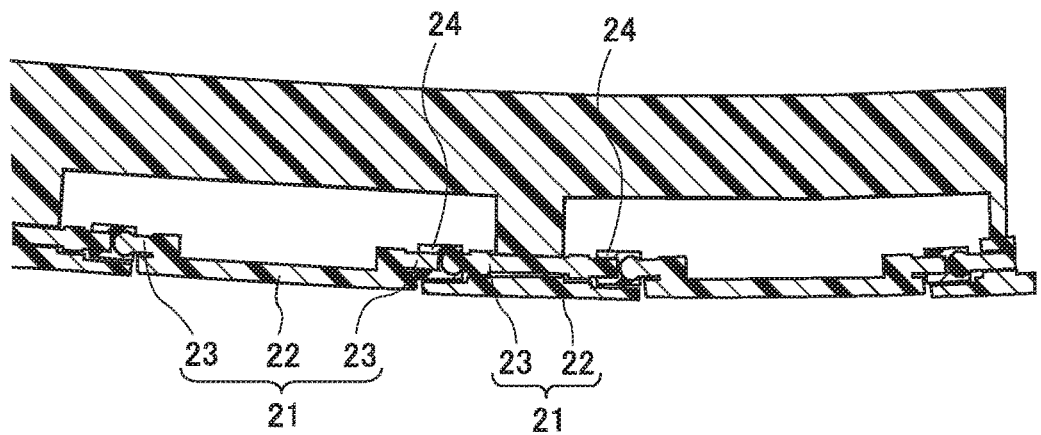
FIG. 17 is a cross-sectional view of the present vehicular grill shutter device according to Second Modified Embodiment when cut along the line "XVII"-"XVII" shown in FIG. 11.

As illustrated in FIG. 17, the fins 21 are constructed so that the support shaft 23 of a first of the fins 21, which is arranged in a first of the opening holes 13, and the support shaft 23 of a second of the fins 21, which is arranged in a second of the opening holes 13 obliquely to the first opening hole 13 in the right/left direction, join to one another via a first of the universal joints 24, and so on. FIGS. 14 through 16 illustrate a fin row 25 including a group of the nine-membered fins 21, which join to each other in series via the universal joints 24. Although the fin row 25 includes two fins 21 arranged to obliquely neighbor one another in the vehicular width direction, it appears to include the fins 25 joining to each other linearly when viewed on the vehicular front side. Moreover, the drawings illustrate a group of the four-membered fin rows 25 arranged so as to line up in the hole latitudinal direction of the opening holes 13, namely, in the up/down direction.

The respective support shafts 23 of the multiple fins 21, the constituent elements of the fin rows 25, do not necessarily extend in directions all of which coincide with each other. Although the support shafts 23 appear to extend linearly when viewed on the vehicular front side, their extending directions make slightly displaced angles to each other so that the fins 21 fit into a curved configuration of the grill 10. Note that the slightly displaced angles start at a first of the universal joints 24, and are formed between the first universal joint 24 and a second of the neighboring universal joints 24, and so on, when viewed on the vehicular upper side. Moreover, each of the universal joints 24 satisfactorily makes different displaced angles with respect to its two neighboring universal joints 24. In addition, it is admissible that the displaced angles differ from one another between when the fins 21 close the opening 11 in the grill 10 and when they open it.

The thus constructed present grill shutter device 1 according to Second Modified Embodiment also allows producing the same advantageous effects as those produced by the above-described present vehicular grill shutter devices 1 according to Embodiment and First Modified Embodiment.

The grill shutter devices 1 according to Embodiment as well as First and Second Modified Embodiments comprise the universal joints 24. The universal joints 24 are made of a spherical body including the cylindrical first and second support bores (24a, 24b) engaging with the opposite ends of the support shaft 23 of each of the fins 21. However, the subject matter according to the present invention is not at all limited to the universal joints 24. For example, the universal joints 24 also satisfactorily have any other construction as far as the construction comprises a universal joint capable of transmitting rotations around the axis of one of the support shafts 23 to another one of the support shafts 23 while making a relative angle between the two joined-to-one-another support shafts 23 variable.

Having now fully described the present invention, it will be apparent to one of ordinary skill in the art that many changes and modifications can be made thereto without departing from the spirit or scope of the present invention as set forth herein including the appended claims.

What is claimed is:

1. A grill shutter device for vehicle, the grill shutter device comprising:
    a grill arranged at a front of the vehicle, wherein the grill has a curved configuration such that the grill is curved in a lateral direction of the vehicle, and the grill is provided with an opening that penetrates the grill in a front/rear direction thereof;
    a shutter including a plurality of fins, wherein the fins open and close the opening, are aligned in a vehicular width direction, and are curved to fit the curved configuration of the grill; and
    a drive source driving the shutter so that the fins open and close the opening, wherein
    each of the fins includes:
        a body plate formed as a configuration coinciding with a configuration of a corresponding site in the opening; and
        a support shaft fixed to the body plate and extending linearly in a direction between vehicular-width-direction opposite ends of a corresponding site in the opening, and the support shaft is supported to the grill to rotate when actuated by the drive source;
    the shutter further includes a universal joint joining between the support shafts of two of the fins, which neighbor one another in the vehicular width direction, and
    the support shaft of the fins has opposite ends, one of which is formed in a spherical shape and another one of which is formed in a rectangular shape.

2. The grill shutter device according to claim 1, wherein the shutter includes three or more of the fins joined to each other in series in the vehicular width direction via two or more of the universal joints.

3. The grill shutter device according to claim 1, wherein the drive source includes an output shaft connected with the support shaft of one of the fins that is arranged at either one of vehicular-width-direction opposite ends of the shutter.

4. The grill shutter device according to claim 1, further comprising bearings fixed to the grill, wherein the bearings make the universal joints rotatable relative to the grill.

5. The grill shutter device according to claim 1, wherein the fins are aligned one after another in the vehicular width direction.

6. The grill shutter device according to claim 1, wherein the shutter includes a plurality of fin rows which are aligned in an up/down direction thereof and in which a plurality of the fins are aligned in the vehicular width direction.

7. The grill shutter device according to claim 1, wherein the universal joints not only transmit rotations around an axis of a first of the support shafts to a second of the support shafts joined to the first support shaft, but also make a relative angle between the two joined-to-one-another support shafts variable.

* * * * *